United States Patent
Zobel

(10) Patent No.: US 6,490,085 B1
(45) Date of Patent: Dec. 3, 2002

(54) SYMMETRIC ANASTIGMATIC ENDOSCOPE RELAY SYSTEM

(75) Inventor: Jurgen Zobel, Vernon Hills, IL (US)

(73) Assignee: Richard Wolf GmbH, Knittlingen (DE)

( * ) Notice: Subject to any disclaimer, the term of this patent is extended or adjusted under 35 U.S.C. 154(b) by 67 days.

(21) Appl. No.: 09/790,384

(22) Filed: Feb. 21, 2001

(51) Int. Cl.$^7$ .............................................. G02B 23/00
(52) U.S. Cl. ...................................................... 359/435
(58) Field of Search ................................ 359/434, 435; 600/106, 166; 606/17

(56) References Cited

U.S. PATENT DOCUMENTS

| | | |
|---|---|---|
| 4,946,267 A | 8/1990 | Hoogland |
| 4,964,710 A | 10/1990 | Leiner |
| 4,993,817 A | 2/1991 | Hoogland |
| 5,059,009 A | 10/1991 | McKinley |
| 5,188,092 A | 2/1993 | White |
| 5,233,473 A | 8/1993 | Kanamori |
| 5,461,509 A * | 10/1995 | Canzek ........................ 359/362 |
| 5,568,312 A | 10/1996 | Horton |
| 5,701,200 A | 12/1997 | Horton |
| 5,892,625 A * | 4/1999 | Heimer ........................ 359/665 |

FOREIGN PATENT DOCUMENTS

GB 1443150 A * 7/1976 ........... G02B/23/00

* cited by examiner

Primary Examiner—Cassandra Spyrou
Assistant Examiner—Lee Fineman
(74) Attorney, Agent, or Firm—Cohen, Pontani, Lieberman & Pavane

(57) ABSTRACT

A symmetric relay system for endoscopes includes an optically-aligned pair of elongated concavo-convex rod-type lenses formed from crown glass, to the convex end surface of each of which a meniscus-shaped flint lens is cemented. The concave ends of the rod lenses are disposed to face the intermediate images of the relay system, and the convex ends to face the aperture of the relay system. A pair of achromatic lenses, each formed of a pair of lens elements x, y, are disposed adjacent and in optical alignment with the respective concave ends of the rod lenses between the concave rod ends and the intermediate images. Each achromatic lens fulfills the condition $n_x/n_y = v_x/v_y$. Apochromatic glass combinations may be used in the rod lenses to significantly reduce the secondary spectrum.

33 Claims, 1 Drawing Sheet

SYMMETRIC ANASTIGMATIC ENDOSCOPE RELAY SYSTEM

BACKGROUND OF THE INVENTION

1. Field of the Invention

The present invention relates to optical lens systems and, more particularly, to relay lens systems especially suitable for use in medical endoscopes and other optical imaging devices.

2. Description of Related Art

Medical endoscopes are used to view internal body organs through small openings created in and through the body wall or skin or by way of existing openings or orifices. Such instruments typically include a long, thin, rigid or semi-rigid optical cylinder that is mounted on or to a viewing mechanism or imager. When the endoscope is inserted and positioned for use, an image of the object being viewed is formed by an objective lens at the inserted or distal end of the endoscope. The image passes through a series of relay lenses along the cylinder to a viewer comprising an eyepiece or viewing lens or a video camera or imager at the viewing or proximal end of the endoscope.

The relay lenses must be very narrow and are typically in the range of about 2.4 mm to 6.0 mm in diameter and approximately 20 mm to 50 mm long. Each relay lens is commonly formed of two or more elements, and a pair of relay lenses make up a set of such lenses. Most endoscopes require two or more sets of relay lens pairs for proper operation. The number of sets generally depends on the length and specific requirements of the particular endoscope and/or the application for which it is intended.

Optimization of endoscope performance involves the adjustment, in the design and implementation of the endoscope, of many factors including brightness, contrast, resolution and corrections for various aberrations. Of particular significance are compensations for minimizing the basic Seidel aberrations (spherical aberration, coma, astigmatism, field curvature, distortion and axial and transversal chromatic aberration) as well as secondary spectrum and higher order aberrations. Typically, meaningful correction of one or more of these factors results in a concomitant loss of performance in one or more of the remaining factors.

Brightness of the image that is transmitted through a relay lens system is related to the ratio of the focal length and the diameter of the lens through which the image is being focused, a ratio commonly denoted the f-number. The smaller the f-number, the brighter the image transmitted by the lens. It is preferable in an endoscopic relay lens system to have a system f-number that is as small as possible so that maximum brightness is transmitted from the objective lens to the eyepiece. The resulting image brightness is also impacted by both absorption of energy by the lens media and unwanted reflection losses at interfaces of the lens elements.

Optical systems for medical endoscopes using relay lenses have been known since as early as 1879. In about 1908 a physicist from Zeiss, Moritz Rohr, developed improved optical systems for endoscopes using two or more relay systems. The introduction of anti-reflection coatings for optical components after the end of the Second World War allowed for the use of 3 or more relay systems in an endoscope.

In about 1959, H. H. Hopkins received a patent for a symmetric rod lens system. This relay system technology, and derivatives thereof, became the state of the art for most optical endoscope systems during the 1980's and 1990's. Although the Hopkins rod lens relay system corrects axial aberrations, it does not correct field curvature and astigmatism. Optical systems with that relay system necessarily require corrective elements in the objective system with extreme curvatures which are needed to compensate for the accumulated aberrations of the device's multiple relay systems. The disadvantage of such systems is that for relay lenses with higher numerical apertures, the higher order aberrations of the objective system are unable to fully compensate for the higher order aberrations that are accumulated in the multiple relay systems of the device.

In the 1980's and 1990's efforts were made to develop relay systems for disposable endoscopes. See, for example, U.S. Pat. No. 4,946,267 to Hoogland, U.S. Pat. No. 4,784,118 to Fantone et al., and U.S. Pat. No. 5,188,092 to White. These relay systems use pressed aspheres formed of plastic material. Glass rods with plane surfaces may also be added to increase the numerical aperture. However, these relay lens systems do not attain the image quality achieved by systems using only glass lenses, and neither do they meet the performance expectations of surgeons. In addition, the costs per use tend to be higher, overall, than for endoscopes using non-disposable relay systems.

U.S. Pat. No. 5,059,009 to McKinley discloses an endoscope relay lens system containing a symmetric pair of rod lenses in which long flint glass rod lenses are cemented on opposite sides of a biconvex crown glass rod that is formed from a glass ball. This relay lens system, which forms an imaging system, corrects the off-axial aberrations better than relay lens systems based on the Hopkins patent, although the correction is not complete. Specifically, the meridional image curvature is overcorrected, so that the meridional and sagittal image curvatures bend with the same curvature on both sides of the Gaussian image plane but with different signs. As a result, astigmatism remains in this system. Furthermore, the meridional and sagittal image curvatures bend further away from one another as more relay systems are added. Thus, even if the Petzval sum is corrected using strong curvatures in the objective system, the over-corrected astigmatism of this relay system can only be compensated by an under-correction of astigmatism in the objective system. The consequence is a detrimental effect on correction of the coma.

The shortcomings of the McKinley lens system were partially addressed in U.S. Pat. No. 5,568,312 to Horton, in which the relay lens system comprises three axially aligned cylindrical lens pairs, with each lens pair having two substantially rod-like lenses. The system uses three different materials—namely glass, cement and a polymer—as well as air interfaces to provide improved correction of chromatic and geometric aberrations. The effective f-number of each relay lens element is minimized, as is the number of lens element interfaces, to provide a brighter image. Problems, however, nevertheless remain in this system.

Relay systems currently available need to have both the axial aberration and off-axial aberrations corrected. The objective systems necessary to transfer the viewed object image to the entrance of the relay system and the eyepiece needed to transform the intermediate image from the end of the relay system to the image plane of the endoscope are only able to minimize the aberrations of their associated subsystem, and do not compensate for image aberrations that are accumulated in the relay system as a whole.

In addition, relay lenses for stereo endoscopes require a much higher numerical aperture than do relay lenses for mono endoscopes. Each of the two entrance pupils of a stereo endoscope must be as large as the single entrance pupil of a mono endoscope. But increasing the brightness of current stereo relay lens systems results in an unsatisfactory image. Currently available endoscope relay systems, when used in stereo applications, do not perform as well as mono endoscopes with such relay systems. Surgeons are therefore left in a disadvantaged position as the superior images produced in mono systems lack the apparent depth that can only be achieved with a stereo system.

There is currently a widespread and unsatisfied demand for better mono and stereo endoscopes. Surgeons using these instruments require that the image produced be both clear and sufficiently large and bright, with high resolution and low distortion. It is also desirable for there to be an appreciable three-dimensional or depth perception aspect to the image which requires a stereo relay system rather than a mono system. Finally, resolution in currently available endoscopic optical relay systems is rapidly becoming a limiting factor in the quality of the perceived image. New viewing technology such as HDTV camera sensors and imaging arrays, which allow for greater image resolution than heretofore available CCD (charge-coupled device) video chips, are becoming available for use in conjunction with endoscopes. This technology is driving a demand for endoscopes of increased image brightness, for endoscopes with higher magnification but the same resolution, and for endoscopes with higher resolutions than existing endoscopes. This strong demand for endoscopes with better overall performance can only be satisfied using relay systems of higher numerical aperture and better, or at least equivalent, correction of image aberrations than existing relay systems.

SUMMARY OF THE INVENTION

It is accordingly the desideratum of the present invention to provide a symmetric anastigmatic relay system for endoscopes which includes a relay lens system that corrects off-axial aberrations while exhibiting a higher numerical aperture than existing lens systems.

A symmetric anastigmatic relay system constructed in accordance with the present invention has a longitudinally and optically-aligned pair of meniscus (i.e. concavo-convex) shaped, elongated rod-type lenses formed of crown glass, a pair of meniscus-shaped flint lenses cemented on the convex end surfaces of the rod lenses, and a pair of two-element achromatic lenses positioned adjacent to the opposite-end concave end surfaces of the rod lenses. The achromatic lenses of the inventive arrangement satisfy the condition for "new achromats," namely $n_x/n_y = v_x/v_y$, where n is the refraction index and v is the Abbe number of the lens elements x and y that together form each achromatic lens. The achromatic lenses are mounted adjacent or in close proximity to the concave end faces of the rod lenses between the concave end faces and the intermediate images of the relay system so that they face, or confrontingly oppose, the intermediate images. The flint lenses cemented on the convex end faces of the rod lenses face the aperture of the relay system. The concave surfaces of the rod lenses, in conjunction with the achromatic lenses, reduce the field curvature of the relay system to zero. The cemented surfaces of the rod lenses and the cemented surfaces of the achromatic lenses reduce spherical aberration and astigmatism. Using flint and crown glasses in the rod lenses, in combination with the achromatic lenses, reduces primary chromatic aberrations to a minimum.

In an embodiment of the present invention, apochromatic glass combinations are used in the rod lenses to significantly reduce the secondary spectrum.

In a further embodiment of the invention for relay systems with high numerical aperture, the air surfaces of the flint lenses cemented to the rod lenses are aspheric, thereby providing a further reduction of spherical aberration.

In another embodiment of the invention, a reduction in variations of the correction of aberrations over or across the field of the intermediate images is achieved by making either the air-interfacing surfaces of the negative lens elements or the air-interfacing surfaces of the positive lens elements of the achromatic lenses aspheric.

In yet another embodiment of the invention, for relay systems with both high numerical aperture and large intermediate images, the air surfaces of the flint lenses cemented to the rod lenses and the air surfaces of either the negative lens elements or the positive lens elements of the achromatic lenses are aspheric.

In a still further and most preferred embodiment of the invention, an apochromatic glass combination is used in the rod lenses, aspheric surfaces are used on the air-interfacing surfaces of the flint lenses cemented to the rod lenses, and aspheric surfaces are used on the air-interfacing surfaces of either the negative lens elements or the positive lens elements of the achromatic lenses. Alternatively, instead of providing aspheric surfaces on the air-interfacing surfaces of the flint lenses cemented to the rod lenses, the glass for those flint lenses may be formed or manufactured from an axial gradient material. In another alternative, the glasses for either the negative lens elements or the positive lens elements of the achromatic lenses can be formed from axial gradient material.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE CURRENTLY PREFERRED EMBODIMENTS

Figure 1:
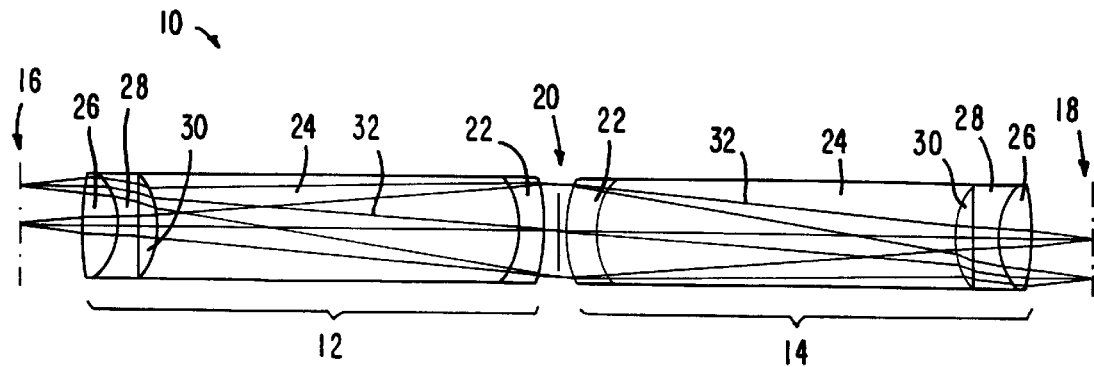
FIG. 1 is an optical schematic of a symmetric relay lens system constructed in accordance with a first embodiment of the present invention.

With initial reference to FIG. 1, a symmetric relay system 10 for endoscopes constructed in accordance with the present invention includes a pair of elongated, meniscus-shaped (i.e. concavo-convex) rod-type lenses 24 that are formed from crown glass. Each rod lens 24 forms a part of a respective first and a second imaging part 12, 14 of the system 10 that are longitudinally aligned and through and along which an image is operatively directed for viewing of the image through an eyepiece or on an electronically-generated display. Since the relay system 10 is symmetric, the relay system can be oriented so that an image is operatively transferred in either direction therethrough; for convenience and ease of discussion, it is assumed herein that a suitable objective lens system—which in an endoscope images an internal body part or object or location and generates a first intermediate image 16 for presentment to the system 10 is located in the drawings at or beyond the lefthand edge of each Figure, and that a suitable eyepiece or digital sensor or other imager (and any associated optics and the like) receives a second intermediate image 18 output from the second imaging part 14 and is located in the drawings at or beyond the righthand edge of each Figure. Neither the objective lens system nor the eyepiece or imager form any part of the present invention, and neither is accordingly shown in the drawings or otherwise herein described. It should also be understood that an endoscope utilizing the inventive relay system may incorporate multiple systems 10 so that, for example, the second intermediate image 18 output by a first system 10 serves as an input image to a suitably-aligned second relay system 10 located, by way of example in the illustrated forms of the invention, to the right of the second imaging part 14 of the depicted first system 10. An aperture 20 is defined or provided between the first and second imaging parts 12, 14 and, in the following description of the components forming the inventive relay system, what is denoted the "aperture end" of each imaging part 12, 14 is that which is located closest to the aperture 20 and what is denoted the "image end" of each imaging part is that located furthest or remote from aperture 20. The transmission of images through the inventive relay system 10 is depicted in the drawings by the rays 32.

The structural components and arrangement of each of the first and second imaging parts 12, 14 of the inventive relay system 10 are the same. In each, a meniscus-shaped flint lens 22 is cemented or otherwise affixed in surface-to-surface relation to the convex aperture end surface of the respective rod lens 24, and an achromatic lens is positioned adjacent or closely proximate the concave image end surface of each rod lens 24 so as to provide an air gap or interface 30 between the rod's image end surface and the confrontingly opposed surface of the respective achromatic lens. Each achromatic lens is formed of a pair of lens elements 26, 28 that are cemented or otherwise affixed together in surface-to-surface relationship with the negative lens element 28 closest the image end of rod lens 24 and the positive lens element 26 closest to or facing the respective intermediate image 16, 18. Most importantly, in accordance with the invention each achromatic lens must fulfill the condition for "new achromats", namely $n_x/n_y=v_x/v_y$ wherein $n_i$ is the refraction index of each respective lens element (i=x, y) and $v_i$ is the Abbe number of each lens element. Thus, each of the achromatic lenses shown in FIG. 1 must satisfy the relationship $n_{26}/n_{28}=v_{26}/v_{28}$ for the lens elements 26, 28.

The combination of the concave image end surfaces of the rod lenses 24, and the adjacently-disposed achromatic lenses meeting the foregoing mathematical condition, result in a highly advantageous reduction of the field of curvature of the relay system to substantially zero. In addition, the cemented (or otherwise affixed) together surfaces of the aperture ends of the rod lenses 24 and the respective flint lenses 22, and the cemented (or otherwise affixed) together confronting surfaces of the lens elements 26, 28 of each achromatic lens, notably and advantageously reduce primary spherical aberration and astigmatism of the resulting relay system.

Moreover, suitable selection of glasses for the flint and crown glasses forming the lenses 22 and 24 and of the lens elements 26, 28 of the achromatic lenses can be utilized to further reduce and minimize spherical aberration and astigmatism exhibited by the inventive relay system. For example, the preferred use of an apochromatic glass combination for the lenses 22, 24 can provide significant reduction of the secondary spectrum.

The appreciable benefits of the present invention are realized in the abovedescribed construction irrespective of many additional details of the inventive relay system. Thus, for example, the size or shape of the air gap 30 that is present, or of the distance, between the concave image end of each rod lens 24 and the opposing end face of the lens element 28 of the adjacently-disposed achromatic lens can be appreciably varied. The shapes or contours of the air-interfacing surfaces of the flint lenses 22, and/or of the lens elements 26, 28 of each achromatic lens, may likewise assume a variety of desired or otherwise appropriate forms, and the thickness and diameter of these lenses and/or lens elements can be variously sized. Those skilled in the art will further recognize that numerous additional modifications of the hereindisclosed details and arrangement of elements, parts and components, and of their interrelationships, can be made as general matters of design choice to satisfy or accommodate special circumstances that may be present or required in a particular system or for a particular or intended application or otherwise, and it should be understood that such modifications are fully within the intended scope and contemplation of the invention.

Figure 2:
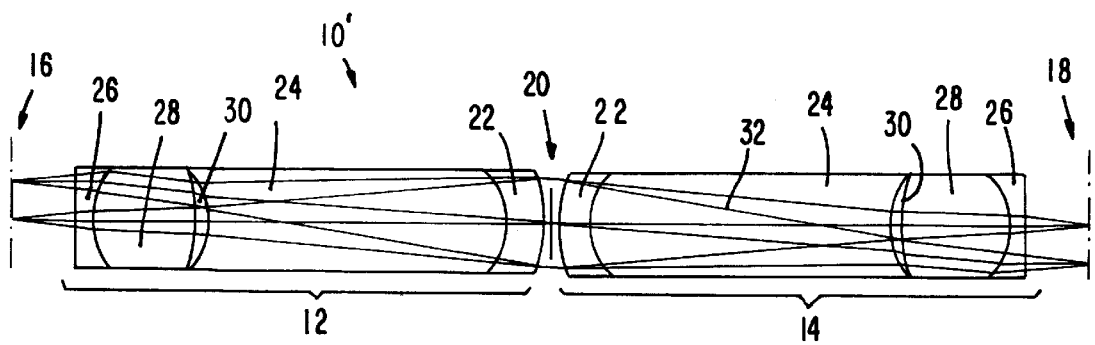
FIG. 2 is an optical schematic of a symmetric relay lens system constructed in accordance with another embodiment of the invention.

One such modification is shown by way of illustrative example in FIG. 2, in which the elements 26, 28 of the achromatic lenses are differently configured than those of the embodiment of FIG. 1. Thus, in the FIG. 2 embodiment the negative lens element 26 is disposed so as to face the respective intermediate image 16, 18, and the positive lens element 28 is disposed in confronting opposition to the concave image end surface of the respective rod lens 24. In any event, as in the FIG. 1 embodiment, and in accordance with the invention, in the alternative arrangement of FIG. 2 the lens elements 26, 28 of each achromatic lens must nevertheless satisfy the relationship $n_{26}/n_{28}=v_{26}/v_{28}$.

A number of expressly-contemplated variations can be applied to suit particular implementations and intended applications. For relay systems utilizing or requiring a high numerical aperture (NA), the air-interfacing surfaces of the flint lenses 22 can be aspherically contoured to further reduce spherical aberrations. Reduction of variations of aberration correction over or across the field of the intermediate images 16, 18 can be achieved by aspherically contouring either the air-interfacing surface of the lens element 26 or the air-interfacing surface of the lens element 28 of each achromatic lens. For relay systems having or requiring both a high numerical aperture and large intermediate images, both the air-interfacing surfaces of the flint lenses 22, and the air-interfacing surface of either the lens element 26 or the lens element 28 of each achromatic lens, can be aspherically contoured to minimize aberrations.

In a most preferred and advantageous form of the invention, both the air-interfacing surfaces of the flint lenses 22, and the air-interfacing surface of either the lens element 26 or the lens element 28 of each achromatic lens, are aspherically contoured and, in addition, the rod lenses 24 and the lenses 22 cemented to the aperture ends of the rod lenses 24 are formed of an apochromatic glass combination.

Another contemplated modification, in lieu of an aspheric air-interfacing surface on each of the flint lenses 22, is to form the lenses 22 of an axial gradient material. Similarly, either the lens element 26 or the lens element 28 of the achromatic lenses can be formed of an axial gradient material in lieu of providing an aspherically-contoured air-interfacing surface thereon.

Moreover, although the connected (i.e. affixed together) lenses 22, 24, and the connected (i.e. affixed together) lens elements 26, 28 of the achromatic lenses, of the herein-disclosed embodiments of the inventive relay system are described as being "cemented" together to achieve their respective integral affixation, any other means or manner or instrumentality suitable for providing an effective surface-to-surface fixation of the particular pairs of components may be employed as a general matter of design choice without unintendedly limiting the scope of the invention. Accordingly, the use herein of the term "cemented" is intended to include all and any such means or form or instrumentality of fixation as is currently or hereinafter becomes known.

The present invention thus offers multiple advantages over prior art relay systems in that the secondary spectrum and higher order aberrations over or across the field can be significantly reduced while using a higher numerical aperture which maximizes field size and allows for superior imaging brightness. The present invention may also, as should therefore be further apparent, be readily utilized in implementing mono, as well as stereo, relay lens applications in endoscopes and, indeed, in other applications and devices in which transfer of an image along a narrow, elongated path is similarly necessary or desired.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A symmetrical relay lens system for transmitting an image through the lens system, comprising:
a first imaging part and a second imaging part optically aligned with said first imaging part, each of said first and second imaging parts comprising:
an elongated concavo-convex rod lens formed of crown glass and having at longitudinally opposite ends a first convex end surface and a second concave end surface;
a concavo-convex flint lens axially aligned with and affixed in surface-to-surface relation to the convex end surface of the rod lens; and
an achromatic lens comprising a positive lens element and a negative lens element affixed together in surface-to-surface, optically-aligned relation and disposed adjacent said second concave end surface of the rod lens and in optically-aligned relation to said rod lens, wherein said positive and negative lens elements satisfy the relationship $n_x/n_y=v_x/v_y$ wherein n is a refraction index of each lens element x, y and v is an Abbe number of each lens element x, y;
wherein said first and second imaging parts are disposed such that the flint lens of said first imaging part is disposed in substantially confronting opposition to the flint lens of said second imaging part.

2. A symmetrical relay lens system in accordance with claim 1, wherein in each of said first and second imaging parts the negative lens element of said achromatic lens is disposed in confronting opposition to the second concave end surface of said rod lens.

3. A symmetrical relay lens system in accordance with claim 1, wherein in each of said first and second imaging parts the positive lens element of said achromatic lens is disposed in confronting opposition to the second concave end surface of said rod lens.

4. A symmetrical relay lens system in accordance with claim 1, wherein in each of said first and second imaging parts the rod lens and the flint lens comprise an apochromatic glass combination.

5. A symmetrical relay lens system in accordance with claim 1, wherein in each of said first and second imaging parts an air-interfacing surface of the flint lens remote from said affixation of the flint lens to said rod lens is aspherically-contoured.

6. A symmetrical relay lens system in accordance with claim 1, wherein in each of said first and second imaging parts:
said positive lens element has an air-interfacing surface remote from said affixation of the positive and negative lens elements, and said negative lens element has an air-interfacing surface remote from said affixation of the positive and negative lens elements; and
one of said air-interfacing surface of the positive lens element and said air-interfacing surface of the negative lens element is aspherically-contoured.

7. A symmetrical relay lens system in accordance with claim 6, wherein in each of said first and second imaging parts an air-interfacing surface of the flint lens remote from said affixation of the flint lens to said rod lens is aspherically-contoured.

8. A symmetrical relay lens system in accordance with claim 7, wherein in each of said first and second imaging parts the rod lens and the flint lens comprise an apochromatic glass combination.

9. A symmetrical relay lens system in accordance with claim 6, wherein in each of said first and second imaging parts the flint lens comprises an axial gradient material.

10. A symmetrical relay lens system in accordance with claim 1, wherein in each of said first and second imaging parts one of said positive lens element and said negative lens element of said achromatic lens comprises an axial gradient material.

11. A symmetrical relay lens system in accordance with claim 10, wherein in each of said first and second imaging parts an air-interfacing surface of the flint lens remote from said affixation of the flint lens to said rod lens is aspherically-contoured.

12. A symmetrical relay lens system in accordance with claim 11, wherein in each of said first and second imaging parts the rod lens and the flint lens comprise an apochromatic glass combination.

13. A symmetrical relay lens system in accordance with claim 10, wherein in each of said first and second imaging parts the flint lens comprises an axial gradient material.

14. A symmetrical relay lens system in accordance with claim 1, wherein in each of said first and second imaging parts said flint lens is affixed to the rod lens by cement.

15. A symmetrical relay lens system in accordance with claim 1, wherein in each of said first and second imaging parts the positive lens element is affixed to the negative lens element by cement.

16. A symmetrical relay lens system in accordance with claim 14, wherein in each of said first and second imaging parts the positive lens element is affixed to the negative lens element by cement.

17. A symmetrical relay lens system in accordance with claim 1, further comprising an aperture defined between the flint lens of said first imaging part and the flint lens of said second imaging part.

18. In a relay lens system for transmitting an image therethrough, an elongated concavo-convex rod lens formed of crown glass and having at longitudinally opposite ends a first convex end surface and a second concave end surface, a concavo-convex flint lens axially aligned with and affixed in surface-to-surface relation to the convex end surface of the rod lens, and an achromatic lens comprising a positive lens element and a negative lens element affixed together in surface-to-surface, optically-aligned relation and disposed adjacent to said second concave end surface of the rod lens and in optically-aligned relation to said rod lens, wherein said positive and negative lens elements satisfy the relationship $n_x/n_{y=v x}/v_y$ wherein n is a refraction index of each lens element x, y and v is an Abbe number of each lens element x, y.

19. A symmetrical relay lens system in accordance with claim 18 wherein the negative lens element of said achromatic lens is disposed in confronting opposition to the second concave end surface of said rod lens.

20. A symmetrical relay lens system in accordance with claim 18, wherein the positive lens element of said achromatic lens is disposed in confronting opposition to the second concave end surface of said rod lens.

21. A symmetrical relay lens system in accordance with claim 18, wherein the rod lens and the flint lens comprise an apochromatic glass combination.

22. A symmetrical relay lens system in accordance with claim 18, wherein an air-interfacing surface of the flint lens remote from said affixation of the flint lens to said rod lens is aspherically-contoured.

23. A symmetrical relay lens system in accordance with claim 18, wherein said positive lens element has an air-interfacing surface remote from said affixation of the positive and negative lens elements, said negative lens element has an air-interfacing surface remote from said affixation of the positive and negative lens elements, and one of said air-interfacing surface of the positive lens element and said air-interfacing surface of the negative lens element is aspherically-contoured.

24. A symmetrical relay lens system in accordance with claim 23, wherein an air-interfacing surface of the flint lens remote from said affixation of the flint lens to said rod lens is aspherically-contoured.

25. A symmetrical relay lens system in accordance with claim 24, wherein the rod lens and the flint lens comprise an apochromatic glass combination.

26. A symmetrical relay lens system in accordance with claim 23, wherein the flint lens comprises an axial gradient material.

27. A symmetrical relay lens system in accordance with claim 18, wherein one of said positive lens element and said negative lens element of said achromatic lens comprises an axial gradient material.

28. A symmetrical relay lens system in accordance with claim 27, wherein an air-interfacing surface of the flint lens remote from said affixation of the flint lens to said rod lens is aspherically-contoured.

29. A symmetrical relay lens system in accordance with claim 28, wherein the rod lens and the flint lens comprise an apochromatic glass combination.

30. A symmetrical relay lens system in accordance with claim 27, wherein the flint lens comprises an axial gradient material.

31. A symmetrical relay lens system in accordance with claim 18, wherein said flint lens is affixed to the rod lens by cement.

32. A symmetrical relay lens system in accordance with claim 18, wherein the positive lens element is affixed to the negative lens element by cement.

33. A symmetrical relay lens system in accordance with claim 31, wherein the positive lens element is affixed to the negative lens element by cement.

* * * * *